(12) United States Patent
Sun et al.

(10) Patent No.: US 9,342,059 B2
(45) Date of Patent: May 17, 2016

(54) AUTOMATIC VOLTAGE CONTROL METHOD BASED ON COOPERATIVE GAME THEORY

(71) Applicant: Tsinghua University, Beijing (CN)

(72) Inventors: Hongbin Sun, Beijing (CN); Qinglai Guo, Beijing (CN); Mingye Zhang, Beijing (CN); Boming Zhang, Beijing (CN); Wenchuan Wu, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 415 days.

(21) Appl. No.: 13/965,332

(22) Filed: Aug. 13, 2013

(65) Prior Publication Data

US 2014/0046501 A1    Feb. 13, 2014

(30) Foreign Application Priority Data

Aug. 13, 2012    (CN) .......................... 2012 1 0287259

(51) Int. Cl.
*G05B 11/01*    (2006.01)
*H02J 3/16*    (2006.01)
*H02J 3/00*    (2006.01)

(52) U.S. Cl.
CPC . *G05B 11/01* (2013.01); *H02J 3/16* (2013.01); *G06F 2217/78* (2013.01); *H02J 2003/007* (2013.01); *Y02E 40/34* (2013.01)

(58) Field of Classification Search
CPC ...... G05B 11/01; H02J 3/16; H02J 2003/007; G06F 2217/78; Y02E 40/34
See application file for complete search history.

(56) References Cited

U.S. PATENT DOCUMENTS

| 7,343,360 | B1 * | 3/2008 | Ristanovic | ............. | G06Q 30/08 705/412 |
| 2008/0077368 | A1 * | 3/2008 | Nasle | ..................... | G05B 17/02 703/4 |
| 2008/0167064 | A1 * | 7/2008 | Bar-Ness | ............ | H04W 52/146 455/522 |
| 2013/0085614 | A1 * | 4/2013 | Wenzel | ................. | F24F 11/006 700/277 |

* cited by examiner

*Primary Examiner* — Mohammad Ali
*Assistant Examiner* — Nathan L Laughlin
(74) *Attorney, Agent, or Firm* — David D. Brush; Westman Champlin & Koehler, P.A.

(57) ABSTRACT

A security and economy coordinated automatic voltage control method based on a cooperative game theory is provided. The method includes: establishing a multi-objective reactive voltage optimizing model of a power system; resolving the multi-objective reactive voltage optimizing model into an economy model and a security model; solving the economy model and the security model based on the cooperative game theory to obtain the automatic voltage control instruction; and performing an automatic voltage control for the power system according to the automatic voltage control instruction.

9 Claims, 1 Drawing Sheet

AUTOMATIC VOLTAGE CONTROL METHOD BASED ON COOPERATIVE GAME THEORY

CROSS-REFERENCE TO RELATED APPLICATION

This application claims priority to and benefits of Chinese Patent Application Serial No. 201210287259.X, filed with the State Intellectual Property Office of P. R. China on Aug. 13, 2012, the entire content of which is incorporated herein by reference.

FIELD

The present disclosure relates to a field of an operation and control of a power system, and more particularly to an automatic voltage control method based on a cooperative game theory.

BACKGROUND

An automatic voltage control (AVC) system is an important means to ensure a secure, economic and high-quality operation of a power grid. A principle of the AVC lies in realizing a reasonable distribution of a reactive voltage in the power grid by coordinately controlling a reactive power output of a generator, a transformer tap, and a reactive power compensation apparatus, thus increasing a voltage stability margin, reducing an active power transmission loss, and improving a voltage eligibility rate, etc. A primary means for determining a coordinated controlling instruction is to solve an optimal power flow (OPF) model.

With an increasing security requirement of a power grid operation, in an automatic voltage control process, a control result needs to satisfy a static security requirement, except that a base state security of the power system needs to be constrained. A security constrained optimal power flow (SCOPF) model is thus introduced to simultaneously take into account the security and economy of the power system, so as to generate an automatic voltage control instruction meeting the static security requirement.

Steps of a typical security and economy coordinated automatic voltage control method may be illustrated as follows.

In step 1, a static security constrained optimal power flow (SCOPF) model (1) is constructed.

$$\min f(x_0, u_0)$$

$$\text{s.t. } g_0(x_0, u_0) = 0$$

$$g_k(x_k, u_0) = 0$$

$$\underline{u} \leq u_0 \leq \overline{u}$$

$$\underline{x} \leq x_0 \leq \overline{x}$$

$$\underline{x}^C \leq x_k \leq \overline{x}^C$$

$$k = 1, \ldots, N_C \quad (1)$$

where k is a series number of a power system state, k=0 represents the base state (or known as a pre-contingency state), k=1, ..., $N_C$ represents a $k^{th}$ post-contingency state (the contingency is predetermined, and is an outage of a component (such as a transmission line, a transformer, a generator, a load, a bus) of the power system and a combination thereof), $N_C$ is the number of the contingencies; $u_0$ is a control variable vector, $x_0$ is a state variable vector of the pre-contingency state, $x_k$ is a state variable vector of the $k^{th}$ post-contingency state; a value of the control variable (such as a voltage amplitude of a generator bus) usually stays the same in the pre-contingency state and in the post-contingency states; a value of the state variable, which is usually different in the pre-contingency state and in the post-contingency states, is determined by a network structure of the power system, a parameter of an element, and the value of the control variable, such as a voltage amplitude of a load bus, a voltage amplitude of a contact bus, a reactive power output of a generator, and a voltage phase angle of each bus; an object function $f(x_0, u_0)$ is the active power transmission loss of the power system, a constraint equation $g_0(x_0, u_0) = 0$ is the power flow equation of the power system in the pre-contingency state, $g_k(x_k, u_0) = 0$ is a power flow equation of the power system in the $k^{th}$ post-contingency state; $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, $\underline{x}^C$ is a lower limit of the state variable vectors in the post-contingency states, and $\overline{x}^C$ is an upper limit of the state variable vectors in the post-contingency states.

In step 2, the static security constrained optimal power flow model is solved to obtain the automatic voltage control instruction.

In step 3, an automatic voltage control is performed for the power system according to the automatic voltage control instruction.

For the typical security and economy coordinated automatic voltage control method, because a number of the contingencies is generally large so as to make an optimization model huge in scale, it is generally difficult to solve the optimization model in a practical conducting process of an automatic voltage control, and it is substantially impossible to solve the optimization model in a time required by an online conducting. Meanwhile, because of a strict post-contingency security constraint, it is possible to make a feasible region of the optimization model (1) void, that is, there is no feasible solution, and thus a usable automatic voltage control instruction may not be obtained. Moreover, it is difficult for this method to flexibly expand different security constraints. Therefore, it is difficult for this typical security and economy coordinated automatic voltage control method to meet a requirement of an online conducting of the automatic voltage control.

SUMMARY

Embodiments of the present disclosure seek to solve at least one of the problems existing in the prior art to at least some extent. Accordingly, a new security and economy coordinated automatic voltage control method based on the cooperative game theory is provided. With the automatic voltage control method based on the cooperative game theory according to embodiments of the present disclosure, both a solving difficulty and a model scale of an automatic voltage control are greatly reduced, and a time consuming of a calculation may meet a requirement of an online conducting of the automatic voltage control. In the case where a static security of the power system is strictly required so that there is no solution for the model (1), a coordinated solution with a tradeoff between the economy and the security may be given by the method of the present disclosure so as to provide the automatic voltage control instruction. Moreover, different security constraints (such as a voltage stability margin in a post-contingency state) may be flexibly expanded by using this method.

According to embodiments of the present disclosure, a security and economy coordinated automatic voltage control method based on a cooperative game theory is provided. The automatic voltage control method based on the cooperative game theory comprises steps of:

S1, establishing a multi-objective reactive voltage optimizing model (2) of a power system:

$$\min EI(u_0, x_0)$$

$$\min SI(x_1, \ldots, x_{N_C})$$

$$\text{s.t. } g_0(u_0, x_0) = 0$$

$$g_k(u_0, x_k) = 0$$

$$\underline{u} \leq u_0 \leq \overline{u}$$

$$\underline{x} \leq x_0 \leq \overline{x}$$

$$SI(x_1, \ldots, x_{N_C}) \leq SI^{Base}$$

$$k = 1, \ldots, N_C \qquad (2)$$

where k is a series number of a power system state, $N_C$ is the number of contingencies, $u_0$ is a control variable vector, $x_0$ is a state variable vector in a pre-contingency state, $x_k$ is a state variable vector in the $k^{th}$ post-contingency state, a constraint equation $g_0(x_0, u_0) = 0$ is a power flow equation of the power system in the pre-contingency state, $g_k(x_k, u_0) = 0$ is a power flow equation of the power system in the $k^{th}$ post-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, EI is an economy index of the power system, SI is a security index of the power system, and $SI^{Base}$ is a security index of the power system before an automatic voltage control instruction is performed, min means minimize and s.t. means subject to;

S2, resolving the multi-objective reactive voltage optimizing model (2) into an economy model (3) and a security model (4), in which the economy model (3) is:

$$\min EI(u_0, x_0)$$

$$\text{s.t. } g_0(u_0, x_0) = 0$$

$$\underline{u} + \underline{\epsilon}_u \leq u_0 \leq \overline{u} + \overline{\epsilon}_u$$

$$\underline{x} + \underline{\epsilon}_x \leq x_0 \leq \overline{x} + \overline{\epsilon}_x \qquad (3)$$

where $\underline{\epsilon}_u$ is a relaxation vector of the lower limit $\underline{u}$ of the control variable vector, $\overline{\epsilon}_u$ is a relaxation vector of the upper limit $\overline{u}$ of the control variable vector, $\underline{\epsilon}_x$ is a relaxation vector of the lower limit $\underline{x}$ of the state variable vector in the pre-contingency state, and $\overline{\epsilon}_x$ is a relaxation vector of the upper limit $\overline{x}$ of the state variable vector in the pre-contingency state;

and the security model (4) is:

$$\min SI(x_1, \ldots, x_{N_C})$$

$$\text{s.t. } g_k(u_0, x_k) = 0$$

$$SI(x_1, \ldots, x_{N_C}) \leq SI^{Base}$$

$$k = 1, \ldots, N_C \qquad (4);$$

S3, solving the economy model (3) and the security model (4) based on the cooperative game theory to obtain the automatic voltage control instruction; and S4, performing an automatic voltage control for the power system according to the automatic voltage control instruction.

In one embodiment of the present disclosure, the automatic voltage control method comprises steps of:

S1', establishing by a calculating unit a multi-objective reactive voltage optimizing model (2) of a power system:

$$\min EI(u_0, x_0)$$

$$\min SI(x_1, \ldots, x_{N_C})$$

$$\text{s.t. } g_0(u_0, x_0) = 0$$

$$g_k(u_0, x_k) = 0$$

$$\underline{u} \leq u_0 \leq \overline{u}$$

$$\underline{x} \leq x_0 \leq \overline{x}$$

$$SI(x_1, \ldots, x_{N_C}) \leq SI^{Base}$$

$$k = 1, \ldots, N_C \qquad (2)$$

where k is a series number of a power system state, $N_C$ is the number of contingencies, $u_0$ is a control variable vector, $x_0$ is a state variable vector in a pre-contingency state, $x_k$ is a state variable vector in the $k^{th}$ post-contingency state, a constraint equation $g_0(x_0, u_0) = 0$ is a power flow equation of the power system in the pre-contingency state, $g_k(x_k, u_0) = 0$ is a power flow equation of the power system in the $k^{th}$ post-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, EI is an economy index of the power system, SI is a security index of the power system, and $SI^{Base}$ is a security index of the power system before an automatic voltage control instruction is performed, min means minimize and s.t. means subject to;

S2', resolving by the calculating unit the multi-objective reactive voltage optimizing model (2) into the economy model (3) and the security model (4), in which the economy model (3) is:

$$\min EI(u_0, x_0)$$

$$\text{s.t. } g_0(u_0, x_0) = 0$$

$$\underline{u} + \underline{\epsilon}_u \leq u_0 \leq \overline{u} + \overline{\epsilon}_u$$

$$\underline{x} + \underline{\epsilon}_x \leq x_0 \leq \overline{x} + \overline{\epsilon}_x \qquad (3)$$

where $\underline{\epsilon}_u$ is a relaxation vector of the lower limit $\underline{u}$ of the control variable vector, $\overline{\epsilon}_u$ is a relaxation vector of the upper limit $\overline{u}$ of the control variable vector, $\underline{\epsilon}_x$ is a relaxation vector of the lower limit $\underline{x}$ of the state variable vector in the pre-contingency state, and $\overline{\epsilon}_x$ is a relaxation vector of the upper limit $\overline{x}$ of the state variable vector in the pre-contingency state;

and the security model (4) is:

$$\min SI(x_1, \ldots, x_{N_C})$$

$$\text{s.t. } g_k(u_0, x_k) = 0$$

$$SI(x_1, \ldots, x_{N_C}) \leq SI^{Base}$$

$$k = 1, \ldots, N_C \qquad (4);$$

S3', solving by the calculating unit the economy model (3) and the security model (4) based on the cooperative game theory to obtain the automatic voltage control instruction; and S4', performing by a control unit an automatic voltage control for the power system according to the automatic voltage control instruction.

Compared with a conventional security and economy coordinated automatic voltage control method, the security and economy coordinated automatic voltage control method based on a cooperative game theory according to embodiments of the present disclosure at least has following advantages.

1. Both a solving difficulty and a model scale of an automatic voltage control calculation are greatly reduced. Because in a solving process of the game model, the economy model is only a simple optimal power flow model, and a calculation amount of the solving of the security model is very small, the solving difficulty is greatly reduced.

2. The method is applicable to different security constrained conditions. When the security of the power system is not strictly required, the automatic voltage control instruction same or similar with one obtained by the conventional method is obtained. When the static security of the power system is strictly required so that there is no solution for the conventional model (1), a coordinated solution with a tradeoff between the economy and the security may be given so as to provide the automatic voltage control instruction.

3. Different security constraint requirements may be flexibly considered. If an other security requirement (such as the static voltage stability margin in the post-contingency states) except the static security requirement is needed to be considered, only a specific solving method of the security model is required to be adjusted so as to give security limits meeting various security requirements.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
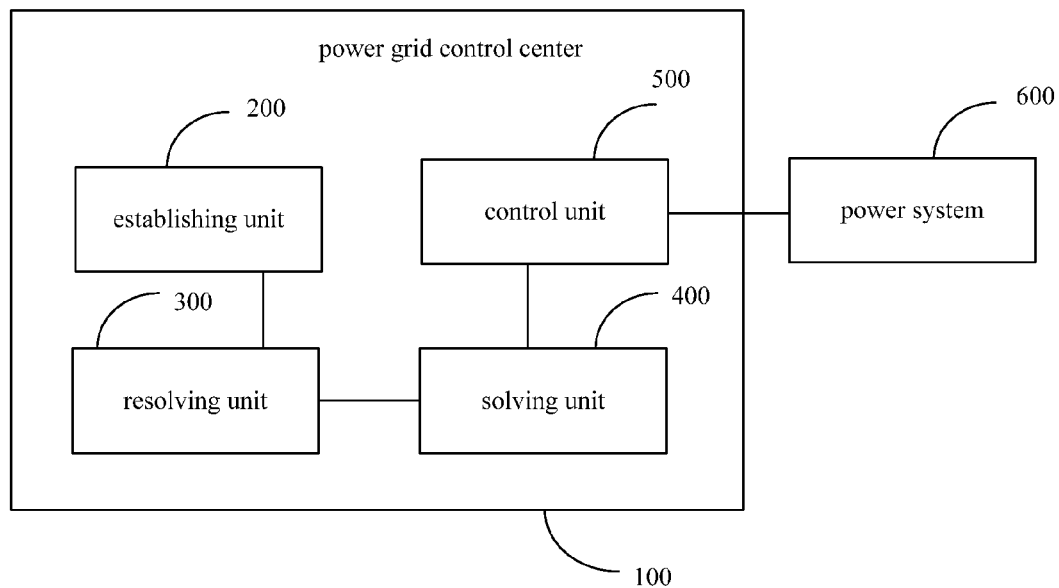
FIG. 1 is a block diagram of a power grid control center for automatically controlling a voltage of a power system based on a cooperative game theory according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

In addition, terms such as "first" and "second" are used herein for purposes of description and are not intended to indicate or imply relative importance or significance.

With a security and economy coordinated automatic voltage control method based on a cooperative game theory according to embodiments of the present disclosure, a multi-objective reactive voltage optimizing model is established and solved based on the cooperative game theory, so as to achieve an coordinative optimization of the security and economy of a power system and thus give a reasonable automatic voltage control instruction.

FIG. 1 is a block diagram of the power grid control center for automatically controlling a voltage of the power system based on a cooperative game theory according to an embodiment of the present disclosure. As shown in FIG. 1, the power grid control center 100 comprises an establishing unit 200, a resolving unit 300, a solving unit 400 and a control unit 500 with electrical communication with each other. The establishing unit 200 is used for establishing a multi-objective reactive voltage optimizing model (2) of a power system. The resolving unit 300 is used for resolving the multi-objective reactive voltage optimizing model (2) into an economy model (3) and a security model (4). The solving unit 400 is used for solving the economy model (3) and the security model (4) based on the cooperative game theory to obtain an automatic voltage control instruction. The control unit 500 is electrically connected to the power system 600 for automatically controlling a voltage thereof according to the automatic voltage control instruction.

The various steps performed by the power grid control center 100, such as by the establishing unit 200, the resolving unit 300, the solving unit 400 and the control unit 500, can be implemented, for example: by the execution of a set of computer instructions executed by a reprogrammable computing machine such as a PC type apparatus, a DSP (a digital signal processor), a micro-controller or other data processor; or else by a dedicated hardware machine or component such as an FPGA (Field Programmable Gate Array), an ASIC (Application-Specific Integrated Circuit) or any other hardware module. In case the algorithm defining the method is implemented in a reprogrammable computing machine, the corresponding program (i.e. the set of instructions) can be stored in a non-transitory computer-readable medium, which may be detachable (for example a memory card, a CD-ROM or a DVD-ROM) or non-detachable, such a embedded RAM or an addressable memory available on a network.

The automatic voltage control method based on the cooperative game theory comprises following steps.

In step S1, a multi-objective reactive voltage optimizing model (2) of the power system is established by the establishing unit 200.

$$\min EI(u_0, x_0)$$

$$\min SI(x_1, \ldots, x_{N_C})$$

$$\text{s.t. } g_0(u_0, x_0) = 0$$

$$g_k(u_0, x_k) = 0$$

$$\underline{u} \leq u_0 \leq \overline{u}$$

$$\underline{x} \leq x_0 \leq \overline{x}$$

$$SI(x_1, \ldots, x_{N_C}) \leq SI^{Base}$$

$$k = 1, \ldots, N_C \quad (2)$$

where k is a series number of a power system state, $N_C$ is the number of the contingencies, $u_0$ is a control variable vector, $x_0$ is a state variable vector of a pre-contingency state, $x_k$ is a state variable vector of a $k^{th}$ post-contingency state, a constraint equation $g_0(x_0, u_0)=0$ is a power flow equation of the power system in the pre-contingency state, $g_k(x_k, u_0)=0$ is a power flow equation of the power system in the $k^{th}$ post-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, $\underline{x}^C$ is a lower limit of the state variable vectors in the post-contingency states, $\overline{x}^C$ is an upper limit of the state variable vectors in the post-contingency states, EI is an economy index of the power system, SI is a security index of the power system, and $SI^{Base}$ is a security index of the power system before an automatic voltage control instruction is performed, min means minimize and s.t. means subject to.

In step S2, the multi-objective reactive voltage optimizing model (2) is resolved into an economy model (3) and a security model (4) by the resolving unit 300, in which the economy model (3) is:

$$\min EI(u_0, x_0)$$

$$\text{s.t. } g_0(u_0, x_0)=0$$

$$\underline{u}+\underline{\epsilon}_u \leq u_0 \leq \overline{u}+\overline{\epsilon}_u$$

$$\underline{x}+\underline{\epsilon}_x \leq x_0 \leq \overline{x}+\overline{\epsilon}_x \quad (3)$$

where $\underline{\epsilon}_u$ is a relaxation vector of the lower limit $\underline{u}$ of the control variable vector, $\overline{\epsilon}_u$ is a relaxation vector of the upper limit $\overline{u}$ of the control variable vector, $\underline{\epsilon}_x$ is a relaxation vector of the lower limit $\underline{x}$ of the state variable vector in the pre-contingency state, and $\overline{\epsilon}_x$ is a relaxation vector of the upper limit $\overline{x}$ of the state variable vector in the pre-contingency state; and the security model (4) is:

$$\min SI(x_1, \ldots, x_{N_C})$$

$$\text{s.t. } g_k(u_0, x_k)=0$$

$$SI(x_1, \ldots, x_{N_C}) \leq SI^{Base}$$

$$k=1, \ldots, N_C \quad (4);$$

In step S3, the economy model (3) and the security model (4) are solved by the solving unit 400 based on the cooperative game theory to obtain the automatic voltage control instruction.

In step S4, an automatic voltage control is performed for the power system by the control unit 500 according to the automatic voltage control instruction.

In one embodiment, the step S1 may further comprise following steps.

In step S11, an active power transmission loss of the power system in the pre-contingency state is made as the economy index of the power system to establish a calculating formula (5) of the economy index of the power system by the establishing unit 200:

$$EI = P_{Loss}(x_0, u_0) \quad (5)$$

where $P_{Loss}$ is a function of the active power transmission loss of the power system;

In step S12, a calculating formula of the security index of the power system is established by the establishing unit 200 by any one of following formulas:

$$SI = \max_k \|\delta(x_k)\|_\infty = \max_k \max_i \delta(x_{i,k}) \quad (6)$$

$$SI = \max_k \|\delta(x_k)\|_1 = \max_k \sum_i \delta(x_{i,k}) \quad (7)$$

$$SI = \sum_k \|\delta(x_k)\|_1 = \sum_k \sum_i \delta(x_{i,k}) \quad (8)$$

where $\delta(x_k) = [\delta(x_{1,k}), \ldots, \delta(x_{i,k}), \ldots, \delta(x_{n_x,k})]^T$, i is a sequence number of elements in the state variable vector $x_k$, $i=1, \ldots n_x$, $\delta(x_{i,k})$ is a violation of an $i^{th}$ element $x_{i,k}$ in the state variable vector $x_k$, and $n_x$ is the number of elements in the state variable vector $x_k$.

In one embodiment, $\delta(x_{i,k})$ may be an upper limit of a violation of $x_{i,k}$ calculated by a formula (9), a lower limit of a violation of $x_{i,k}$ calculated by a formula (10), or a violation of $x_{i,k}$ calculated by a formula (11):

$$\delta(x_{i,k}) = \max\{x_{i,k} - \overline{x}_i^C, 0\} \quad (9)$$

$$\delta(x_{i,k}) = \max\{\underline{x}_i^C - x_{i,k}, 0\} \quad (10)$$

$$\delta(x_{i,k}) = \max\{x_{i,k} - \overline{x}_i^C, \underline{x}_i^C - x_{i,k}, 0\} \quad (11).$$

where $\overline{x}_i^C$ is an $i^{th}$ element in vector $\overline{x}^C$, $\overline{x}^C$ is a lower limit of state variable vectors in post-contingency states, $\underline{x}_i^C$ is an $i^{th}$ element in vector $\underline{x}^C$, and $\underline{x}^C$ is a lower limit of state variable vectors in post-contingency states.

In step S13, the multi-objective reactive voltage optimizing model (2) of the power system is established by the establishing unit 200 using the formulas in step S11 and step S12 as an optimization objective.

$$\min EI(u_0, x_0)$$

$$\min SI(x_1, \ldots, x_{N_C})$$

$$\text{s.t. } g_0(u_0, x_0) = 0$$

$$g_k(u_0, x_k) = 0$$

$$\underline{u} \leq u_0 \leq \overline{u}$$

$$\underline{x} \leq x_0 \leq \overline{x}$$

$$SI(x_1, \ldots, x_{N_C}) \leq SI^{Base}$$

$$k = 1, \ldots, N_C \quad (2)$$

In one embodiment, the step S3 may further comprise following steps.

In step S31, t=1 is assumed, where t is a sequence number of a game cycle, and $t \in N_+$, $N_+$ is a set of positive integers.

In step S32, $\underline{u}^{(t)} = \underline{u}$, $\overline{u}^{(t)} = \overline{u}$, $\underline{x}^{(t)} = \underline{x}$, $\overline{x}^{(t)} = \overline{x}$ are assumed.

In step S33, the economy model (3) is solved by the solving unit 400 according to a formula (12) to obtain a solution $(u_0^{(t)}, x_0^{(t)})$ of the economy model (3), $$\min EI(u_0, x_0)$$

$$\text{s.t. } g_0(u_0, x_0) = 0$$

$$\underline{u} + \underline{\epsilon}_u \leq u_0 \leq \overline{u}^{(t)} + \overline{\epsilon}_u$$

$$\underline{x}^{(t)} + \underline{\epsilon}_x \leq x_0 \leq \overline{x}^{(t)} + \overline{\epsilon}_x \quad (12).$$

In one embodiment, a solving process of the formula (12) may be illustrated in detail as follows.

In step S331, $\underline{\epsilon}_u=0$, $\overline{\epsilon}_u=0$, $\underline{\epsilon}_x=0$, $\overline{\epsilon}_x=0$ are assumed.

In step S332, the formula (12) is solved by the solving unit 400, and if there is a solution, obtaining the solution $(u_0^{(t)}, x_0^{(t)})$ of the economy model and step S34 is executed, or else, step S333 is executed.

In step S333, $\underline{\epsilon}_u$, $\overline{\epsilon}_u$, $\underline{\epsilon}_x$, $\overline{\epsilon}_x$ are increased, and step S332 is executed. In one embodiment, according to different scales of the power system for which the automatic voltage control calculation is executed, each of $\underline{\epsilon}_u$, $\overline{\epsilon}_u$, $\underline{\epsilon}_x$, $\overline{\epsilon}_x$ is increased by an amount ranging from 0 to 0.05 each time.

In step S34, when t>1, if $|u_0^{(t)} - u_0^{(t-1)}| \leq tol$ and $|x_0^{(t)} - x_0^{(t-1)}| \leq tol$, where tol is a convergence criterion, step S38 is executed, or else, step S35 is executed. In one embodiment, according to different scales of the power system for which the automatic voltage control calculation is executed, tol is within a range from $10^{-4}$ to $10^{-2}$.

In step S35, a contingency assessment is performed by the solving unit 400 using the solution $(u_0^{(t)}, x_0^{(t)})$ of the economy model (3) as a base state of the power system to obtain a result of the contingency assessment. The contingency assessment means that using a current result of a power flow as a base state of the power system, a result of the power flow after a contingency occurs in the power system is simulated, so as to predict whether a security risk exists in the power system and to determine whether a variable of the power system will be out of limit after a contingency occurs in the power system. And if a security monitor variable (the security monitor variable refers to a variable monitored during a operation of the power system, and for results of the contingency assessment, only the violations of these variables are taken into account) in the result of the contingency assessment has no violation or has a violation less than a maximum violation permitted by a operation of the power system, step S38 is executed, or else, step S36 is executed. The maximum violation permitted by the operation of the power system 600 may be determined according to a practical situation of the power system and a requirement of a relative secure operation regulation (such as "Regulation of Security and Stability of Power System").

In step S36, the security model (4) is solved by the solving unit 400 to obtain security limits $\underline{u}^{(t+1)}$, $\overline{u}^{(t+1)}$, $\underline{x}^{(t+1)}$, $\overline{x}^{(t+1)}$ of variables of the economy model (3) in a $(t+1)^{th}$ game cycle.

In one embodiment, a solving process of the security model (4) may be illustrated in detail as follows.

In step S361, if a variable $x_i$ is a security monitor variable, an upper limit of a violation $\overline{\delta}_{i,k}^{(t)}$ and a lower limit of a violation $\underline{\delta}_{i,k}^{(t)}$ of the variable $x_i$ in the $k^{th}$ post-contingency state in the $t^{th}$ game cycle are calculated by the solving unit 400 according to a formula (13):

$$\overline{\delta}_{i,k}^{(t)} = \begin{cases} x_{i,k}^{(t)} - \overline{x}_i^C & (x_{i,k}^{(t)} > \overline{x}_i^C) \\ 0 & (x_{i,k}^{(t)} \leq \overline{x}_i^C) \end{cases} \quad (13)$$

$$\underline{\delta}_{i,k}^{(t)} = \begin{cases} \underline{x}_i^C - x_{i,k}^{(t)} & (x_{i,k}^{(t)} < \underline{x}_i^C) \\ 0 & (x_{i,k}^{(t)} \geq \underline{x}_i^C) \end{cases}$$

where $k=1, \ldots, N_C$, $i=1, \ldots, n_x$, and $x_i$ is a security monitor variable.

In step S362, it is defined that $$\overline{\delta}_i^{(t)} = \max_k \{\overline{\delta}_{i,k}^{(t)} / s_{i,k}\} \quad (14)$$

$$\underline{\delta}_i^{(t)} = \max_k \{\underline{\delta}_{i,k}^{(t)} / s_{i,k}\}$$

where $s_{i,k}$ is a linear coefficient between a first variation value of the variable $x_i$ in the pre-contingency state and a second variation value of the variable $x_i$ in the $k^{th}$ post-contingency state caused by the first variation value. In practice, the linear coefficient may be determined depending on experience during the calculation process. Generally, it will be more reasonable to evaluate the linear coefficient according to a sensitivity between the first variation value and the second variation value.

In step S363, a security upper limit $\overline{x}_i^{(t+1)}$ and a security lower limit $\underline{x}_i^{(t+1)}$ in the $k^{th}$ post-contingency state in the $(t+1)^{th}$ game cycle are calculated by the solving unit 300 according to a formula (15):

$$\overline{x}_i^{(t+1)} = \begin{cases} x_{i,0}^{(t)} - \overline{\delta}_i^{(t)} & (\overline{\delta}_i^{(t)} \neq 0) \\ \overline{x}_i^{(t)} & (\overline{\delta}_i^{(t)} = 0) \end{cases} \quad (15)$$

$$\underline{x}_i^{(t+1)} = \begin{cases} x_{i,0}^{(t)} + \underline{\delta}_i^{(t)} & (\underline{\delta}_i^{(t)} \neq 0) \\ \underline{x}_i^{(t)} & (\underline{\delta}_i^{(t)} = 0) \end{cases}$$

It should be noted that, other calculation methods of security limits, including upper limit and lower limit, may be adopted according to different security requirements except such method illustrated in this embodiment.

In step S37, t=t+1 is assumed, and step S33 is executed.

In step S38, the solving of the economy model (3) and the security model (4) in the game cycle is terminated to obtain a solution $(u_0^{(t)}, x_0^{(t)})$ of the automatic voltage control and output the automatic voltage control instruction.

The method according to the present disclosure will be further illustrated by means of a specific embodiment below.

Figure 2:
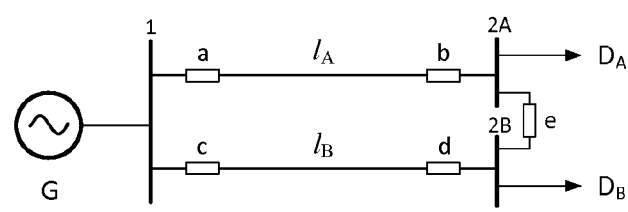
FIG. 2 is a diagram of a power system model of a 2-bus power system to which a security and economy coordinated automatic voltage control method based on a cooperative game theory according to an embodiment of the present disclosure is applied.

In this embodiment, the security and economy coordinated automatic voltage control method based on the cooperative game theory is applied to a 2-bus power system. A system model of the 2-bus power system is shown in FIG. 2. As shown in FIG. 2, a generator bus 1 connected with a generator G supplying power to a load terminal via two parallel lines $l_A$ and $l_B$, a subpart bus 2A of the load terminal is connected with a load $D_A$, a subpart bus 2B of the load terminal is connected with a load $D_B$, and a, b, c, d, e are isolation switches. Parameters (including an impedance $z_A$ of the line $l_A$, an impedance $z_B$ of the line $l_B$, a complex power $S_{D,A}$ of the load $D_A$, a complex power $S_{D,B}$ of the load $D_B$) of the power system are shown as follows:

$z_A = r_A + jx_A = 0.004 + j0.4$ $z_B = r_B + jx_B = 0.004 + j0.4$ $S_{D,A} = P_{D,A} + jQ_{D,A} = 0.2 + j0.1$ $S_{D,B} = P_{D,B} + jQ_{D,B} = 0.8 + j0.4$ where $r_A$ is a resistance of the line $l_A$, $r_B$ is a resistance of the line $l_B$, $x_A$ is a reactance of the line $l_A$, $r_B$ is a reactance of the line $l_B$, $P_{D,A}$ is an active power of the load $D_A$, $P_{D,B}$ is an active power of the load $D_B$, $Q_{D,A}$ is a reactive power of the load $D_A$, and $Q_{D,A}$ is a reactive power of the load $D_B$.

A result of the power flow of the power system before the automatic voltage control calculation is shown in Table 1, where a subscribe "0" represents the pre-contingency state of the power system.

TABLE 1

Result of power flow of 2-bus power system before automatic voltage control calculation

| $V_{G0}^{base}$ | $P_{G0}^{base}$ | $Q_{G0}^{base}$ | $V_{D0}^{base}$ | $\theta_0^{base}$ |
|---|---|---|---|---|
| 1.1500 | 1.0023 | 0.7332 | 1.0353 | −0.1679 |

A voltage amplitude of each bus is set as a security monitor variable. Voltage limits of a voltage amplitude $V_{G0}$ of the generator bus, a voltage amplitude $V_{D0}$ of a load bus in the pre-contingency state, and a voltage amplitude $V_{D1}$ of the load bus in the post-contingency state are set as follows:

$$V_{G0} \in [\underline{V}_G, \overline{V}_G] = [0.9, 1.2]$$

$$V_{D0} \in [\underline{V}_D, \overline{V}_D] = [0.9, 1.1]$$

$$V_{D1} \in [\underline{V}_D^C, \overline{V}_D^C] = [0.85, 1.15]$$

In one embodiment, a first case is set that, the contingency is a switch-off of each of the isolation switches d and e, that is, the subpart bus 2B quits a running.

Although a conventional SCOPF model has a solution in this case, because of a requirement of a security constraint in a post-contingency state, the solution is different from that of an optimal power flow without the security constraint in a post-contingency state. In this case, with the method according to embodiments of this disclosure, after the contingency assessment is performed to the solution of the economy model in a first game cycle, it is found that the voltage amplitude $V_{D1}$ of the load bus in the post-contingency state is beyond an upper limit and thus a security index of the power system does not achieve an optimal value. Then, the security model is solved to obtain security limits for the economy model in a next game cycle. Then the limit of voltage amplitude of the load bus is adjusted, and the solution of the economy model is re-solved in the next game cycle. So repeatedly, in a fourth game cycle (i.e., t=4), the security index of the power system is 0.0 and thus the security achieves the optimization. The game solving is terminated here and the solution of the automatic voltage control is obtained. A solving process is illustrated in detail as follows.

Firstly, the control variables and the state variables are analyzed. The voltage amplitude $V_{G0}$ of the generator bus, which usually stays the same in the pre-contingency state and in the post-contingency states, is the control variable of the 2-bus power system. And other variables, including an active power output $P_G$ of the generator, a reactive power output $Q_G$ of the generator, the voltage amplitude $V_D$ of the load bus, a voltage phase angle $\theta_G$ of the generator bus, and a voltage phase angle $\theta_D$ of the load bus, which are usually different in the pre-contingency state and in the post-contingency states, are the state variables of the 2-bus power system. Therefore, the control variable vector $u=\{V_G\}$, and the state variable vector $x=\{P_G, Q_G, V_D, \theta\}$, where $\theta=\theta_G-\theta_D$.

In step S1", the multi-objective reactive voltage optimizing model of the 2-bus power system in the first case is established. In one embodiment, the step S1" may further comprise following steps.

In step S11", the active power transmission loss of the power system in the pre-contingency state is calculated according to a difference between the active power output of the generator and the active powers of the loads to obtain the calculation formula of the economy index of the power system:

$$EI = P_{Loss}(x_0, u_0) = P_{G0} - P_{D.A} - P_{D.B}$$

In step S12", the violations amount of the security monitor variables is calculated by the formula (11), and the security index of the power system is calculated by the formula (6). Because the voltage amplitudes of the buses are set as the security scrutiny variables, only the violations of the voltage amplitudes of the buses are taken into account to obtain the security index by a SI formula (16)

$$SI = \max_{k=0,1} \max(\delta(V_{G,k}), \delta(V_{D,k})) = \max(\delta(V_{G0}), \delta(V_{D0}), \delta(V_{D1})). \quad (16)$$

The voltage amplitudes of the buses before the automatic voltage control calculation and the upper and lower limits of the voltage amplitudes of the buses are put into the formula (16) to obtain $SI^{Base} = 0.1067$.

In step S13", a power flow equation set of the 2-bus power system in the first case is as follows:

$$g_k(u_0, x_k) =$$

$$\begin{cases} P_{Gk} - V_{G0}^2 G_{GGk} - V_{G0} V_{Dk} G_{GDk} \cos\theta_k + V_{G0} V_{Dk} B_{GDk} \sin\theta_k = 0 \\ Q_{Gk} + V_{G0}^2 B_{GGk} + V_{G0} V_{Dk} B_{GDk} \cos\theta_k + V_{G0} V_{Dk} G_{GDk} \sin\theta_k = 0 \\ P_{Dk} + V_{Dk}^2 G_{DDk} + V_{Dk} V_{G0} G_{DGk} \cos\theta_k + V_{Dk} V_{G0} B_{DGk} \sin\theta_k = 0 \\ Q_{Dk} - V_{Dk}^2 B_{DDk} - V_{Dk} V_{G0} B_{DGk} \cos\theta_k + V_{Dk} V_{G0} G_{DGk} \sin\theta_k = 0 \end{cases}$$

where $$\begin{bmatrix} G_{GGk} & G_{GDk} \\ G_{DGk} & G_{DDk} \end{bmatrix} = \begin{bmatrix} \dfrac{r_k}{r_k^2 + x_k^2} & \dfrac{-r_k}{r_k^2 + x_k^2} \\ \dfrac{-r_k}{r_k^2 + x_k^2} & \dfrac{r_k}{r_k^2 + x_k^2} \end{bmatrix},$$

$$\begin{bmatrix} B_{GGk} & B_{GDk} \\ B_{DGk} & B_{DDk} \end{bmatrix} = \begin{bmatrix} \dfrac{-x_k}{r_k^2 + x_k^2} & \dfrac{x_k}{r_k^2 + x_k^2} \\ \dfrac{x_k}{r_k^2 + x_k^2} & \dfrac{-x_k}{r_k^2 + x_k^2} \end{bmatrix}$$

When k=0, $r_0 = r_A // r_B = 0.002$, $x_0 = x_A // x_B = 0.2$; when k=1, $r_1 = r_A = 0.004$, $x_1 = x_A = 0.4$. In addition, when k=0, $P_{D0} = P_{D.A} + P_{D.B}$, $Q_{D0} = Q_{D.A} + Q_{D.B}$; when k=1, $P_{D0} = P_{D.A}$, $Q_{D0} = Q_{D.A}$.

The multi-objective reactive voltage optimizing model of the 2-bus power system in the first case can be established by all formulas above as follows.

$$\min P_{G0} - P_{D.A} - P_{D.B}$$

$$\min \max(\delta(V_{G0}), \delta(V_{D0}), \delta(V_{D1}))$$

s.t. $P_{G0} - 0.0500 V_{G0}^2 + 0.0500 V_{G0} V_{D0} \cos\theta_0 + 4.9995 V_{G0} V_{D0} \sin\theta_0 = 0$ $Q_{G0} - 4.9995 V_{G0}^2 + 4.9995 V_{G0} V_{D0} \cos\theta_0 - 0.0500 V_{G0} V_{D0} \sin\theta_0 = 0$ $P_{D0} + 0.0500 V_{Dk}^2 - 0.0500 V_{D0} V_{G0} \cos\theta_0 + 4.9995 V_{D0} V_{G0} \sin\theta_0 = 0$ $Q_{D0} + 4.9995 V_{D0}^2 - 4.9995 V_{D0} V_{G0} \cos\theta_0 - 0.0500 V_{D0} V_{G0} \sin\theta_0 = 0$ $P_{G1} - 0.0250 V_{G0}^2 + 0.0250 V_{G0} V_{D1} \cos\theta_1 + 2.4998 V_{G0} V_{D1} \sin\theta_1 = 0$ $Q_{G1} - 2.4998V_{G0}^2 + 2.4998V_{G0}V_{D1}\cos\theta_1 - 0.0250V_{G0}V_{D1}\sin\theta_1 = 0$ $P_{D1} + 0.0250V_{D1}^2 - 0.0250V_{D1}V_{G0}\cos\theta_1 + 2.4998V_{D1}V_{G0}\sin\theta_1 = 0$ $Q_{D1} + 2.4998V_{D1}^2 - 2.4998V_{D1}V_{G0}\cos\theta_1 - 0.0250V_{D1}V_{G0}\sin\theta_1 = 0$ $0.9 \leq V_{G0} \leq 1.2$ $0.9 \leq V_{D0} \leq 1.1$ $\max(\delta(V_{G0}), \delta(V_{D0}), \delta(V_{D1})) \leq 0.1067$ In step S2″, the multi-objective reactive voltage optimizing model is resolved into an economy model and a security model, in which the economy model is:

$\min P_{G0} - P_{D.A} - P_{D.B}$ s.t. $P_{G0} - 0.0500V_{G0}^2 + 0.0500V_{G0}V_{D0}\cos\theta_0 + 4.9995V_{G0}V_{D0}\sin\theta_0 = 0$ $Q_{G0} - 4.9995V_{G0}^2 + 4.9995V_{G0}V_{D0}\cos\theta_0 - 0.0500V_{G0}V_{D0}\sin\theta_0 = 0$ $P_{D0} + 0.0500V_{Dk}^2 - 0.0500V_{D0}V_{G0}\cos\theta_0 + 4.9995V_{D0}V_{G0}\sin\theta_0 = 0$ $Q_{D0} + 4.9995V_{D0}^2 - 4.9995V_{D0}V_{G0}\cos\theta_0 - 0.0500V_{D0}V_{G0}\sin\theta_0 = 0$ $\underline{V}_G + \underline{\epsilon}_{V_G} \leq V_{G0} \leq \overline{V}_G + \overline{\epsilon}_{V_G}$ $\underline{V}_D + \underline{\epsilon}_{V_D} \leq V_{D0} \leq \overline{V}_D + \overline{\epsilon}_{V_D}$ and the security model is:

$\min \max(\delta(V_{G0}), (\delta(V_{D0}), \delta(V_{D1}))$ s.t. $P_{G1} - 0.0250V_{G0}^2 + 0.0250V_{G0}V_{D1}\cos\theta_1 + 2.4998V_{G0}V_{D1}\sin\theta_1 = 0$ $Q_{G1} - 2.4998V_{G0}^2 + 2.4998V_{G0}V_{D1}\cos\theta_1 - 0.0250V_{G0}V_{D1}\sin\theta_1 = 0$ $P_{D1} + 0.0250V_{D1}^2 - 0.0250V_{D1}V_{G0}\cos\theta_1 + 2.4998V_{D1}V_{G0}\sin\theta_1 = 0$ $Q_{D1} + 2.4998V_{D1}^2 - 2.4998V_{D1}V_{G0}\cos\theta_1 - 0.0250V_{D1}V_{G0}\sin\theta_1 = 0$ $\max(\delta(V_{G0}), (\delta(V_{D0}), (\delta(V_{D1})) \leq 0.1067$ In step S3″, the economy model and the security model are solved based on the cooperative game theory to obtain the automatic voltage control instruction as follows.

Firstly, t=1 is assumed; $\underline{V}_G^{(1)} = \underline{V}_G = 0.9$, $\overline{V}_G^{(1)} = \overline{V}_G = 1.2$, $\underline{V}_D^{(1)} = \underline{V}_D = 0.9$, $\overline{V}_D^{(1)} = \overline{V}_D = 1.1$ are assumed; and $\underline{\epsilon}_{V_G} = 0$, $\overline{\epsilon}_{V_G} = 0$, $\underline{\epsilon}_{V_D} = 0$, $\overline{\epsilon}_{V_D} = 0$ are assumed to solve the economy model as follows.

$\min P_{G0} - P_{D.A} - P_{D.B}$ s.t. $P_{G0} - 0.0500V_{G0}^2 + 0.0500V_{G0}V_{D0}\cos\theta_0 + 4.9995V_{G0}V_{D0}\sin\theta_0 = 0$ $Q_{G0} - 4.9995V_{G0}^2 + 4.9995V_{G0}V_{D0}\cos\theta_0 - 0.0500V_{G0}V_{D0}\sin\theta_0 = 0$ $P_{D0} + 0.0500V_{Dk}^2 - 0.0500V_{D0}V_{G0}\cos\theta_0 + 4.9995V_{D0}V_{G0}\sin\theta_0 = 0$ $Q_{D0} + 4.9995V_{D0}^2 - 4.9995V_{D0}V_{G0}\cos\theta_0 - 0.0500V_{D0}V_{G0}\sin\theta_0 = 0$ $\underline{V}_G^{(1)} + \underline{\epsilon}_{V_G} \leq V_{G0} \leq \overline{V}_G^{(1)} + \overline{\epsilon}_{V_G}$ $\underline{V}_D^{(1)} + \underline{\epsilon}_{V_D} \leq V_{D0} \leq \overline{V}_D^{(1)} + \overline{\epsilon}_{V_D}$ The economy model is solved and the result may be obtained as follows.

| $V_{G0}^{(1)}$ | $P_{G0}^{(1)}$ | $Q_{G0}^{(1)}$ | $V_{D0}^{(1)}$ | $\theta_0^{(1)}$ |
|---|---|---|---|---|
| 1.2000 | 1.0021 | 0.7094 | 1.0928 | −0.1523 |

The contingency assessment is performed using the result above as the base state of the power system to calculate each variable value of the power system in the post-contingency state. A result may be obtained as follows.

| $V_{G0}^{(1)}$ | $P_{G1}^{(1)}$ | $Q_{G1}^{(1)}$ | $V_{D1}^{(1)}$ | $\theta_1^{(1)}$ |
|---|---|---|---|---|
| 1.2000 | 0.2001 | 0.1148 | 1.1630 | −0.0571 |

It can be known from the result above that when the contingency occurs, the voltage amplitude $V_{D1}^{(1)} = 1.1630$ of the load bus is beyond an upper limit 1.15. Thus, the solution of the economy model does not meet the security constraint requirement, and the security model needs to be solved to obtain new security limits $\overline{V}_D^{(2)}$ and $\underline{V}_D^{(2)}$.

It can be obtained from the formula (13) that $\overline{\delta}_{V_D,1}^{(1)} = V_{D1}^{(1)} - \overline{V}_D^C = 0.0130$ and $\underline{\delta}_{V_D,1}^{(1)} = 0$. For any contingency and voltage amplitude of any bus, taking $s_{i,k} = 1$, then it may be obtained that $\overline{\delta}_{V_D}^{(1)} = \max\{\overline{\delta}_{V_D,1}^{(1)}/s_{V_D,1}\} = 0.0130$ and $\underline{\delta}_{V_D}^{(1)} = \max\{\underline{\delta}_{V_D,1}^{(1)}/s_{V_D,1}\} = 0$. Thus security limits $\overline{V}_D^{(2)} = \overline{V}_D^{(1)} - \overline{\delta}_{V_D}^{(1)} = 1.0798$ and $\underline{V}_D^{(2)} = \underline{V}_D^{(1)} + \underline{\delta}_{V_D}^{(1)} = 0.9$ of the economy model in a next game cycle may be obtained.

Meanwhile, the voltage amplitude of the generator bus has no violation when the contingency occurs, so the security model does not need to obtain new security limits of it. That is to say $\overline{V}_G^{(2)} = \overline{V}_G^{(1)}$ and $\underline{V}_G^{(2)} = \underline{V}_G^{(1)}$.

Then t=2 is assumed; and $\underline{\epsilon}_{V_G} = 0$, $\overline{\epsilon}_{V_G} = 0$, $\underline{\epsilon}_{V_D} = 0$, $\overline{\epsilon}_{V_D} = 0$ are assumed. The security upper limit and lower limit of $V_{G0}$ may be set as $\underline{V}_G^{(2)} + \underline{\epsilon}_{V_G} \leq V_{G0} \leq \overline{V}_G^{(2)} + \overline{\epsilon}_{V_G}$, and the security upper limit and lower limit of $V_{D0}$ may be set as $\underline{V}_D^{(2)} + \underline{\epsilon}_{V_D} \leq V_{D0} \leq \overline{V}_D^{(2)} + \overline{\epsilon}_{V_D}$ to re-solve the economy model. A result may be obtained as follows.

| $V_{G0}^{(2)}$ | $P_{G0}^{(2)}$ | $Q_{G0}^{(2)}$ | $V_{D0}^{(2)}$ | $\theta_0^{(2)}$ |
|---|---|---|---|---|
| 1.1886 | 1.0021 | 0.7144 | 1.0798 | −0.1557 |

Because now t>1, a difference between the solution of the economy model in this game cycle and the solution of the economy model in the last game cycle needs to be judged. In this embodiment, the convergence criterion tol is set as tol=$10^{-4}$. It is obvious that the difference between the solutions of the economy model in the two game cycles is greater than the convergence criterion tol and thus the calculation will continue. The contingency assessment is performed using the result above as the base state of the power system to obtain the result of the contingency assessment as follows.

| $V_{G0}^{(2)}$ | $P_{G1}^{(2)}$ | $Q_{G1}^{(2)}$ | $V_{D1}^{(2)}$ | $\theta_1^{(2)}$ |
|---|---|---|---|---|
| 1.1886 | 0.2002 | 0.1151 | 1.1511 | −0.0582 |

Now, the voltage amplitude of the load bus in the post-contingency state $V_{D_1}^{(2)}=1.1511$ is still beyond the upper limit 1.15. Thus, the solution of the economy model does not meet the security constraint requirement, and the security model needs to be solved. Similar with a calculating process of the last game cycle, it may be obtained that $\overline{\delta}_{V_D,1}^{(2)}=0.0011$, $\underline{\delta}_{V_D,1}^{(2)}=0$, $\overline{\delta}_{V_D}^{(2)}=0.0011$, $\underline{\delta}_{V_D}^{(2)}=0$. Thus security limits of the load bus $\overline{V}_D^{(3)}=1.0787$ and $\underline{V}^{(3)}=0.9$ of the economy model in a next game cycle may be further obtained. And for the generator bus, $\overline{V}_G^{(3)}=\overline{V}_G^{(2)}$, $\underline{V}_G^{(3)}=\underline{V}_G^{(2)}$.

Then t=3 is assumed; and, $\underline{\epsilon}_{V_G}=0$, $\overline{\epsilon}_{V_G}=0$, $\underline{\epsilon}_{V_D}=0$, $\overline{\epsilon}_{V_D}=0$ are assumed. The security upper limit and lower limit of $V_{G0}$ may be set as $\underline{V}_G^{(3)}+\underline{\epsilon}_{V_G} \leq V_{G0} \leq \overline{V}_G^{(3)}+\overline{\epsilon}_{V_G}$, and the security upper limit and lower limit of may be set as $V_{D0}$ may be $\underline{V}_D^{(3)}+\underline{\epsilon}_{V_D} \leq V_{D0} \leq \overline{V}_D^{(3)}+\overline{\epsilon}_{V_D}$ to re-solve the economy model. A result may be obtained as follows.

| $V_{G0}^{(3)}$ | $P_{G0}^{(3)}$ | $Q_{G0}^{(3)}$ | $V_{D0}^{(3)}$ | $\theta_0^{(3)}$ |
|---|---|---|---|---|
| 1.1877 | 1.0021 | 0.7149 | 1.0787 | −0.1560 |

A difference between the solution of the economy model in this game cycle and the solution of the economy model in the last game cycle is greater than the convergence criterion tol and thus the calculation will continue. The contingency assessment is performed using the result above as the base state of the power system to obtain the result of the contingency assessment as follows.

| $V_{G0}^{(3)}$ | $P_{G1}^{(3)}$ | $Q_{G1}^{(3)}$ | $V_{D1}^{(3)}$ | $\theta_1^{(3)}$ |
|---|---|---|---|---|
| 1.1877 | 0.2002 | 0.1151 | 1.1502 | −0.0583 |

Now, the voltage amplitude of the load bus in the post-contingency state $V_{D_1}^{(3)}=1.1502$ is still beyond the upper limit 1.15. Thus, the solution of the economy model does not meet the security constraint requirement, and the security model needs to be solved. Similar with the calculating process of the last game cycle, security limits of the load bus $\overline{V}_D^{(4)}=1.0785$ and $\underline{V}^{(4)}=0.9$ of the economy model in a next game cycle may be further obtained. And for the generator bus, $\overline{V}_G^{(4)}=\overline{V}_G^{(3)}$, $\underline{V}_G^{(4)}=\underline{V}_G^{(3)}$.

Then t=4 is assumed; and, $\underline{\epsilon}_{V_G}=0$, $\overline{\epsilon}_{V_G}=0$, $\underline{\epsilon}_{V_D}=0$, $\overline{\epsilon}_{V_D}=0$ are assumed. The security upper limit and lower limit of $V_{G0}$ may be set as $\underline{V}_G^{(4)}+\underline{\epsilon}_{V_G} \leq V_{G0} \leq \overline{V}_G^{(4)}+\overline{\epsilon}_{V_G}$, and the security upper limit and lower limit of $V_{D0}$ may be set as $\underline{V}_D^{(4)}+\underline{\epsilon}_{V_D} \leq V_{D0} \leq \overline{V}_D^{(4)}+\overline{\epsilon}_{V_D}$ to re-solve the economy model. A result may be obtained as follows.

| $V_{G0}^{(4)}$ | $P_{G0}^{(4)}$ | $Q_{G0}^{(4)}$ | $V_{D0}^{(4)}$ | $\theta_0^{(4)}$ |
|---|---|---|---|---|
| 1.1875 | 1.0021 | 0.7149 | 1.0785 | −0.1560 |

Now, the voltage amplitude of the load bus in the post-contingency state $V_{D_1}^{(4)}=1.1500$ meets the security constraint requirement. The value of the security monitor variables do not have any violation, the game solving is terminated, and the automatic voltage control instruction $V_{G0}=1.1875$ is obtained.

A solving result of the first case of the embodiment using the conventional SCOPF model is shown in Table 2. The result of each game cycle in the solving process hereinabove according to embodiments of the present disclosure is shown in Table 3. It can be found by comparison that results of the two methods are identical and the automatic voltage control instructions given are also identical.

TABLE 2

Result of conventional SCOPF model

| $V_{G0}$ | 1.1875 | | |
|---|---|---|---|
| $P_{G0}$ | 1.0021 | $P_{G1}$ | 0.2002 |
| $Q_{G0}$ | 0.7149 | $Q_{G1}$ | 0.1151 |
| $V_{D0}$ | 1.0785 | $V_{D1}$ | 1.1500 |
| $\theta_0$ | −0.1560 | $\theta_1$ | −0.0583 |
| EI | 0.0021 | SI | 0.0000 |

TABLE 3

Result of method of present disclosure

| game cycle | | 1 | 2 | 3 | 4 |
|---|---|---|---|---|---|
| solution of | $\overline{V}_D$ | 1.1000 | 1.0798 | 1.0787 | 1.0785 |
| security model | $\underline{V}_D$ | 0.9000 | 0.9000 | 0.9000 | 0.9000 |
| solution of | $V_{G0}$ | 1.2000 | 1.1886 | 1.1877 | 1.1875 |
| economy | $P_{G0}$ | 1.0021 | 1.0021 | 1.0021 | 1.0021 |
| model | $Q_{G0}$ | 0.7094 | 0.7144 | 0.7149 | 0.7149 |
| | $V_{D0}$ | 1.0928 | 1.0798 | 1.0787 | 1.0785 |
| | $\theta_0$ | −0.1523 | −0.1557 | −0.1560 | −0.1560 |
| contingency | $P_{G1}$ | 0.2001 | 0.2002 | 0.2002 | 0.2002 |
| assessment | $Q_{G1}$ | 0.1148 | 0.1151 | 0.1151 | 0.1151 |
| | $V_{D1}$ | 1.1630 | 1.1511 | 1.1502 | 1.1500 |
| | $\theta_1$ | −0.0571 | −0.0582 | −0.0583 | −0.0583 |
| EI | | 0.0021 | 0.0021 | 0.0021 | 0.0021 |
| SI | | 0.0130 | 0.0011 | 0.0002 | 0.0000 |
| game terminated | | No | No | No | Yes |

Another two cases of embodiments of the present disclosure are set hereinafter to further illustrate advantages of the present disclosure at various situations. In these two cases, the above process flow are used for calculation, and each parameter in the calculating process, such as $s_{i,k}$, the convergence criterion tol is set as the same as that of the first case.

In one embodiment, a second case is set that, the contingency is a switch-off of the isolation switches c and d, that is, an outage of the transmission line $1_B$.

In this case, the conventional SCOPF model has a solution, and the solution is identical with the optimal power flow without the security constraints in the post-contingency state. In this case, with the method according to embodiments of this disclosure, the solution of the economy model in the first game cycle meets the security constraint requirement, and the values of the security monitor variables in the result of the contingency assessment do not have any violation. Thus, the result of the game may be obtained by only one game cycle, and the result is identical with that of the conventional SCOPF model. The result of the conventional SCOPF model is shown in Table 4 and the result of the method of the present disclosure is shown in Table 5.

TABLE 4

Result of conventional SCOPF model

| $V_{G0}$ | 1.2000 | | |
|---|---|---|---|
| $P_{G0}$ | 1.0021 | $P_{G1}$ | 1.0065 |
| $Q_{G0}$ | 0.7094 | $Q_{G1}$ | 1.1465 |
| $V_{D0}$ | 1.0928 | $V_{D1}$ | 0.8794 |
| $\theta_0$ | −0.1523 | $\theta_1$ | −0.3867 |
| EI | 0.0021 | SI | 0.0000 |

TABLE 5

Result of method of present disclosure

| game cycle | | 1 |
|---|---|---|
| solution of security model | $\overline{V}_D$ | 1.1000 |
| | $\underline{V}_D$ | 0.9000 |
| solution of economy model | $V_{G0}$ | 1.2000 |
| | $P_{G0}$ | 1.0021 |
| | $Q_{G0}$ | 0.7094 |
| | $V_{D0}$ | 1.0928 |
| | $\theta_0$ | −0.1523 |
| contingency assessment | $P_{G1}$ | 1.0065 |
| | $Q_{G1}$ | 1.1465 |
| | $V_{D1}$ | 0.8794 |
| | $\theta_1$ | −0.3867 |
| EI | | 0.0021 |
| SI | | 0.0000 |
| game terminated | | Yes |

In one embodiment, a third case is set that, the contingency is a switch-off of the isolation switches c and d, that is, an outage of the transmission line $l_B$, and a constraint of the voltage amplitude of the generator bus is adjusted as $V_{G0} \in [0.9, 1.15]$.

The conventional SCOPF model does not have any solution in this case. Using the method of the present disclosure, the contingency assessment is performed for the solution of the economy model in the first game cycle to obtain that the voltage amplitude of the load bus in the post-contingency state $V_{D1}$ has a low violation. The security model needs to be solved to obtain new security limits so as to eliminate the violation situation. The new security limits are required to increase the voltage amplitude $V_{G0}$ of the generator bus. However, because the voltage amplitude $V_{G0}$ of the generator bus in the solution of the economy model in the first game cycle has reached the upper limit, in order to eliminate or reduce the violation amount of the voltage amplitude $V_{D1}$ of the load bus, the security constraint of the voltage amplitude $V_{G0}$ of the generator bus needs to be relaxed properly so as to enable the economy model to have a solution. Since the security constraint is relaxed, it has to sacrifice some security of the power system. Therefore, the game can only reduce the security index as far as possible rather than makes the security index to 0.0. In the fourth game cycle, the difference between the solution of the economy model and the solution of the economy model in the last game cycle is less than the convergence criterion tol, and thus the game is terminated. Although now final voltage amplitude of the generator bus in the pre-contingency state $V_{G0}$ and voltage amplitude of the load bus in the post-contingency state $V_{D1}$ are out of the security constraint scopes thereof, this is a solution that has the minimum security index (i.e., the maximum voltage amplitude violation). When the security constraint is strictly required so that the conventional SCOPF model has no solution, it is significant to obtain such a suboptimal solution for guiding an operation of the power system. The result of the method of the present disclosure is shown in Table 6.

TABLE 6

Result of method of present disclosure

| game cycle | | 1 | 2 | 3 | 4 |
|---|---|---|---|---|---|
| solution of security model | $\overline{V}_G$ | 1.1500 | 1.1805 | 1.1757 | 1.1756 |
| | $\underline{V}_G$ | 0.9000 | 0.9000 | 0.9000 | 0.9000 |
| | $\overline{V}_D$ | 1.1000 | 1.1000 | 1.1000 | 1.1000 |
| | $\underline{V}_D$ | 0.9000 | 1.0705 | 1.0650 | 1.0649 |

TABLE 6-continued

Result of method of present disclosure

| game cycle | | 1 | 2 | 3 | 4 |
|---|---|---|---|---|---|
| solution of economy model | $V_{G0}$ | 1.1500 | 1.1805 | 1.1757 | 1.1756 |
| | $P_{G0}$ | 1.0023 | 1.0022 | 1.0022 | 1.0022 |
| | $Q_{G0}$ | 0.7332 | 0.7182 | 0.7204 | 0.7205 |
| | $V_{D0}$ | 1.0353 | 1.0705 | 1.0650 | 1.0649 |
| | $\theta_0$ | −0.1679 | −0.1581 | −0.1596 | −0.1596 |
| contingency assessment | $P_{G1}$ | 1.0091 | 1.0071 | 1.0074 | 1.0074 |
| | $Q_{G1}$ | 1.4051 | 1.2146 | 1.2351 | 1.2355 |
| | $V_{D1}$ | 0.7433 | 0.8365 | 0.8248 | 0.8245 |
| | $\theta_1$ | −0.4844 | −0.4148 | −0.4229 | −0.4231 |
| EI | | 1.0023 | 1.0022 | 1.0022 | 1.0022 |
| SI | | 0.1067 | 0.0305 | 0.0257 | 0.0256 |
| game terminated | | No | No | No | Yes |

Reference throughout this specification to "an embodiment," "some embodiments," "one embodiment", "another example," "an example," "a specific example," or "some examples," means that a particular feature, structure, material, or characteristic described in connection with the embodiment or example is contained in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments may not be construed to limit the present disclosure, and changes, alternatives, and modifications may be made in the embodiments without departing from spirit, principles and scope of the present disclosure.

What is claimed is:

1. An automatic voltage control method based on a cooperative game theory, comprising acts of:

S1, establishing a multi-objective reactive voltage optimizing model (1) of a power system:

min $EI(u_0, x_0)$ min $SI(x_1, \ldots, x_{N_C})$ s.t. $g_0(u_0, x_0) = 0$ $g_k(u_0, x_k) = 0$ $\underline{u} \leq u_0 \leq \overline{u}$ $\underline{x} \leq x_0 \leq \overline{x}$ $SI(x_1, \ldots, x_{N_C}) \leq SI^{Base}$ $k = 1, \ldots, N_C$ \hfill (1)

where k is a series number of a power system state, $N_C$ is the number of contingencies, $u_0$ is a control variable vector, $x_0$ is a state variable vector in a pre-contingency state, $x_k$ is a state variable vector in a $k^{th}$ post-contingency state, a constraint equation $g_0(x_0, u_0) = 0$ is a power flow equation of the power system in the pre-contingency state, $g_k(x_k, u_0) = 0$ is a power flow equation of the power system in the $k^{th}$ post-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, EI is an economy index of the power system, SI is a security index of the power system, and $SI^{Base}$ is a security index of the power system before an automatic voltage control instruction is performed, min means minimize and s.t. means subject to;

S2, resolving the multi-objective reactive voltage optimizing model (1) into an economy model (2) and a security model (3), wherein
the economy model (2) is:

$$\min EI(u_0, x_0)$$

$$\text{s.t. } g_0(u_0, x_0) = 0$$

$$\underline{u} + \underline{\epsilon}_u \leq u_0 \leq \overline{u} + \overline{\epsilon}_u$$

$$\underline{x} + \underline{\epsilon}_x \leq x_0 \leq \overline{x} + \overline{\epsilon}_x \quad (2)$$

where $\underline{\epsilon}_u$ is a relaxation vector of the lower limit $\underline{u}$ of the control variable vector, $\overline{\epsilon}_u$ is a relaxation vector of the upper limit $\overline{u}$ of the control variable vector, $\underline{\epsilon}_x$ is a relaxation vector of the lower limit $\underline{x}$ of the state variable vector in the pre-contingency state, and $\overline{\epsilon}_x$ is a relaxation vector of the upper limit $\overline{x}$ of the state variable vector in the pre-contingency state;

and the security model (3) is:

$$\min SI(x_1, \ldots, x_{N_C})$$

$$\text{s.t. } g_k(u_0, x_k) = 0$$

$$SI(x_1, \ldots, x_{N_C}) \leq SI^{Base}$$

$$k = 1, \ldots, N_C \quad (3);$$

S3, solving the economy model (2) and the security model (3) based on the cooperative game theory to obtain the automatic voltage control instruction; and S4, performing an automatic voltage control for the power system according to the automatic voltage control instruction.

2. The automatic voltage control method according to claim 1, wherein

S1', the act of establishing comprises establishing by an establishing unit the multi-objective reactive voltage optimizing model (1) of a power system;

S2', the act of resolving comprises resolving by a resolving unit the multi-objective reactive voltage optimizing model (1) into the economy model (2) and the security model (3);

S3', the act of solving comprises solving by a solving unit the economy model (2) and the security model (3) based on the cooperative game theory to obtain the automatic voltage control instruction; and S4', the act of performing comprises performing by a control unit the automatic voltage control for the power system according to the automatic voltage control instruction.

3. The automatic voltage control method according to claim 2, wherein act S1 further comprises acts of:

S11, making an active power transmission loss of the power system in the pre-contingency state as the economy index of the power system to establish by the establishing unit a calculating formula (4) of the economy index of the power system:

$$EI = P_{Loss}(x_0, u_0) \quad (4)$$

where $P_{Loss}$ is a function of the active power transmission loss of the power system;

S12, establishing by the establishing unit a calculating formula of the security index of the power system by any one of following formulas:

$$SI = \max_k \|\delta(x_k)\|_\infty = \max_k \max_i \delta(x_{i,k}) \quad (5)$$

$$SI = \max_k \|\delta(x_k)\|_1 = \max_k \sum_i \delta(x_{i,k}) \quad (6)$$

$$SI = \sum_k \|\delta(x_k)\|_1 = \sum_k \sum_i \delta(x_{i,k}) \quad (7)$$

where $\delta(x_k) = [\delta(x_{1,k}), \ldots, \delta(x_{i,k}), \ldots, \delta(x_{n_x,k})]^T$, i is a sequence number of elements in the state variable vector $x_k$, $i = 1, \ldots, n_x$, $\delta(x_{i,k})$ is a violation of an $i^{th}$ element $x_{i,k}$ in the state variable vector $x_k$, and $n_x$ is the number of elements in the state variable vector $x_k$; and S13, establishing by the establishing unit the multi-objective reactive voltage optimizing model (1) of the power system using the formulas in act S11 and act S12 as an optimization objective.

4. The automatic voltage control method according to claim 3, wherein in act S12, $\delta(x_{i,k})$ is an upper limit of a violation of $x_{i,k}$ calculated by a formula (8), a lower limit of a violation of $x_{i,k}$ calculated by a formula (9), or a violation of $x_{i,k}$ calculated by a formula (10):

$$\delta(x_{i,k}) = \max\{x_{i,k} - \overline{x}_i^C, 0\} \quad (8)$$

$$\delta(x_{i,k}) = \max\{\underline{x}_i^C - x_{i,k}, 0\} \quad (9)$$

$$\delta(x_{i,k}) = \max\{x_{i,k} - \overline{x}_i^C, \underline{x}_i^C - x_{i,k}, 0\} \quad (10),$$

where $\overline{x}_i^C$ is an $i^{th}$ element in vector $\overline{x}^C$, $\overline{x}^C$ is a lower limit of state variable vectors in post-contingency states, $\underline{x}_i^C$ is an $i^{th}$ element in vector $\underline{x}^C$, and $\underline{x}^C$ is a lower limit of state variable vectors in post-contingency states.

5. The automatic voltage control method according to claim 2, wherein act S3 further comprises acts of:

S31, assuming $t = 1$, where t is a sequence number of a game cycle, and $t \in N_+$, $N_+$ is a set of positive integers;

S32, assuming $\underline{u}^{(t)} = \underline{u}$, $\overline{u}^{(t)} = \overline{u}$, $\underline{x}^{(t)} = \underline{x}$, $\overline{x}^{(t)} = \overline{x}$;

S33, solving by the solving unit the economy model (2) by a formula (11) to obtain a solution $(u_0^{(t)}, x_0^{(t)})$ of the economy model (2), $$\min EI(u_0, x_0)$$

$$\text{s.t. } g_0(u_0, x_0) = 0$$

$$\underline{u}^{(t)} + \underline{\epsilon}_u \leq u_0 \leq \overline{u}^{(t)} + \overline{\epsilon}_u$$

$$\underline{x}^{(t)} + \underline{\epsilon}_x \leq x_0 \leq \overline{x}^{(t)} + \overline{\epsilon}_x \quad (11)$$

S34, when $t > 1$, if $|u_0^{(t)} - u_0^{(t-1)}| \leq tol$ and $|x_0^{(t)} - x_0^{(t-1)}| \leq tol$, where tol is a convergence criterion, going to act S38, or else, going to act S35;

S35, performing by the solving unit a contingency assessment using the solution $(u_0^{(t)}, x_0^{(t)})$ of the economy model (2) as a base state of the power system to obtain a result of the contingency assessment, and if a security monitor variable in the result of the contingency assessment has no violation or has a violation less than a maximum violation permitted by a operation of the power system, going to act S38, or else, going to act S36;

S36, solving by the solving unit the security model (3) to obtain security limits $\underline{u}^{(t+1)}$, $\overline{u}^{(t+1)}$, $\underline{x}^{(t+1)}$, $\overline{x}^{(t+1)}$ of variables of the economy model (2) in a $(t+1)^{th}$ game cycle;

S37, assuming t=t+1, and going to act S33; and

S38, terminating the solving of the economy model (2) and the security model (3) in the game cycle to obtain a solution $(u_0^{(t)}, x_0^{(t)})$ of the automatic voltage control and output the automatic voltage control instruction.

6. The automatic voltage control method according to claim 5, wherein act S33 further comprises acts of:

S331, assuming $\underline{\epsilon}_u=0$, $\overline{\epsilon}_u=0$, $\underline{\epsilon}_x=0$, $\overline{\epsilon}_x=0$;

S332, solving the formula (11) by the solving unit, and if there is a solution, obtaining the solution $(u_0^{(t)}, x_0^{(t)})$ of the economy model and going to act S34, or else, going to act S333; and S333, increasing $\underline{\epsilon}_u$, $\overline{\epsilon}_u$, $\underline{\epsilon}_x$, $\overline{\epsilon}_x$, and going to act S332.

7. The automatic voltage control method according to claim 6, wherein in act S333, each of $\underline{\epsilon}_u$, $\overline{\epsilon}_u$, $\underline{\epsilon}_x$, $\overline{\epsilon}_x$ is increased by an amount ranging from 0 to 0.05 each time.

8. The automatic voltage control method according to claim 5, wherein in act S34, tol is within a range from $10^{-4}$ to $10^{-2}$.

9. The automatic voltage control method according to claim 5, wherein act S36 further comprises acts of:

S361, if a variable $x_i$ is a security monitor variable, calculating by the solving unit an upper limit of a violation $\overline{\delta}_{i,k}^{(t)}$ and a lower limit of a violation $\underline{\delta}_{i,k}^{(t)}$ of the variable $x_i$ in the $k^{th}$ post-contingency state in a $t^{th}$ game cycle by a formula (12):

$$\overline{\delta}_{i,k}^{(t)} = \begin{cases} x_{i,k}^{(t)} - \overline{x}_i^C & (x_{i,k}^{(t)} > \overline{x}_i^C) \\ 0 & (x_{i,k}^{(t)} \leq \overline{x}_i^C) \end{cases} \quad (12)$$

$$\underline{\delta}_{i,k}^{(t)} = \begin{cases} x_i^C - x_{i,k}^{(t)} & (x_{i,k}^{(t)} < x_i^C) \\ 0 & (x_{i,k}^{(t)} \geq x_i^C) \end{cases}$$

S362, defining $$\overline{\delta}_i^{(t)} = \max_k \{\overline{\delta}_{i,k}^{(t)} / s_{i,k}\} \quad (13)$$

$$\underline{\delta}_i^{(t)} = \max_k \{\underline{\delta}_{i,k}^{(t)} / s_{i,k}\}$$

where $s_{i,k}$ is a linear coefficient between a first variation value of the variable $x_i$ in the pre-contingency state and a second variation value of the variable $x_i$ in the $k^{th}$ post-contingency state caused by the first variation value, and i is a sequence number of elements in the state variable vector $x_k$, $i=1, \ldots, n_x$; and S363, calculating by the solving unit a security upper limit $\overline{x}_i^{(t+1)}$ and a security lower limit $\underline{x}_i^{(t+1)}$ in the $k^{th}$ post-contingency state in a $(t+1)^{th}$ game cycle by a formula (14):

$$\overline{x}_i^{(t+1)} = \begin{cases} x_{i,0}^{(t)} - \overline{\delta}_i^{(t)} & (\overline{\delta}_i^{(t)} \neq 0) \\ \overline{x}_i^{(t)} & (\overline{\delta}_i^{(t)} = 0) \end{cases} \quad (14)$$

$$\underline{x}_i^{(t+1)} = \begin{cases} x_{i,0}^{(t)} + \underline{\delta}_i^{(t)} & (\underline{\delta}_i^{(t)} \neq 0) \\ \underline{x}_i^{(t)} & (\underline{\delta}_i^{(t)} = 0) \end{cases}.$$

* * * * *